United States Patent [19]

Koike

[11] Patent Number: 5,084,865
[45] Date of Patent: Jan. 28, 1992

[54] ECHO CANCELLER HAVING FIR AND IIR FILTERS FOR CANCELLING LONG TAIL ECHOES

[75] Inventor: Shin'ichi Koike, Tokyo, Japan

[73] Assignee: NEC Corporation, Tokyo, Japan

[21] Appl. No.: 484,095

[22] Filed: Feb. 23, 1990

[30] Foreign Application Priority Data

Feb. 23, 1989 [JP] Japan .................................. 1-41804
Dec. 20, 1989 [JP] Japan .................................. 1-328341

[51] Int. Cl.$^5$ .............................................. H04B 3/23
[52] U.S. Cl. .................................. 370/32.1; 379/406; 379/410; 379/411
[58] Field of Search .................. 370/32.1, 6; 379/410, 379/411, 406; 381/71, 94

[56] References Cited

U.S. PATENT DOCUMENTS

| | | | |
|---|---|---|---|
| 4,007,341 | 2/1977 | Sourgens et al. | 379/411 |
| 4,087,654 | 5/1978 | Mueller | 379/411 |
| 4,707,824 | 11/1987 | Kanemasa | 370/32.1 |
| 4,862,449 | 8/1989 | Hoefkens et al. | 370/32.1 |
| 4,965,823 | 10/1990 | Nakagawa et al. | 370/32.1 |

FOREIGN PATENT DOCUMENTS 0281101 9/1988 European Pat. Off. .

*Primary Examiner*—Douglas W. Olms
*Assistant Examiner*—Alpus H. Hsu

*Attorney, Agent, or Firm*—Sughrue, Mion, Zinn, Macpeak & Seas

[57] ABSTRACT

An echo canceller comprises a finite impulse response filter (6) connected to the incoming port of a hybrid (1), and a tail canceller (7) which includes an infinite impulse response filter (24; 40) having a multiplier (14; 33) for recursively multiplying an output digital symbol from the tapped-delay line (8) of the FIR filter with an attenuation coefficient R. A digital symbol from the IIR filter or one from the tapped-delay line (8) is multiplied with a tap-weight coefficient $C_1$ and summed with the outputs of tap-weight multipliers of the FIR filter to produce a replica of an echo symbol, which is subtracted from a digital symbol $y_n$ from the outgoing port of the hybrid (1), producing a residual echo symbol $e_n$. The coefficient $C_1$ is derived from correlation between residual echo $e_n$ and a symbol from the tapped-delay line. In one embodiment, symbol from the tapped-delay line is further delayed (17) for a unit interval on the one hand, and multiplied (18) with coefficient R on the other, the difference between them being detected (19) and multiplied (20) with a coefficient K, which is either sgn($C_1$) or $1/C_1$, to generate a multiplied difference. Correlation is detected (22) between the difference and residual echo $e_n$ to derive the coefficient R. In a second embodiment, symbol from the tapped-delay line is further delayed (36) for a unit interval and multiplied (37) with K to produce a delayed-multiplied symbol. Correlation is detected (35) between it and residual echo $e_n$ to derive the coefficient R.

10 Claims, 5 Drawing Sheets

ECHO CANCELLER HAVING FIR AND IIR FILTERS FOR CANCELLING LONG TAIL ECHOES

BACKGROUND OF THE INVENTION

The present invention relates generally to echo cancellers for a digital communications system, and more particularly to an echo canceller capable of cancelling echoes having a long tail portion.

Two-wire subscriber lines employing an echo canceller are known in the art. The echo canceller of this type has a nonrecursive, or finite impulse response (FIR) filter. Because of the finite number of tap weights, the whole shape of an echo cannot completely be cancelled if it has a long tail portion. A great number of tap weights must be required for complete cancellation of echoes. It is generally known that such a long-tail echo occurs due to the high-pass characteristic of a hybrid, or two-wire four-wire conversion circuit. A typical waveform of such long-tail echoes is one that adopts a negative exponential curve. While the main portion of such a waveform can be cancelled, the remaining tail portion lies outside the range of tap weight control of the FIR filter and remains uncancelled, causing residual echoes to accumulate if $\tau > N1$, where it is the length of an echo, T is a symbol interval and N is the number of tap weights.

European Patent Application 0 281 101 (published on Jan. 31, 1990) discloses an echo canceller which is capable of cancelling long-tail echoes. However, it needs two recursive filters (Infinite Impulse Response filter) to form a tail canceller in addition to a nonrecursive filter.

SUMMARY OF THE INVENTION

It is therefore an object of the present invention to provide an echo canceller capable of cancelling long tail echoes with a simplified tail canceller.

According to a first aspect of the invention, an echo canceller comprises a finite impulse response filter (FIR) and a tail canceller. The finite impulse response filter comprises a tapped-delay line connected to an incoming port of a hybrid, or two-wire four-wire conversion circuit, a plurality of first tap-weight multipliers connected respectively to the successive taps of the delay line for respectively multiplying successively delayed digital symbols with first tap-weight coefficients and an adder for summing the outputs of the first tap-weight multipliers. The tail canceller comprises an infinite impulse response filter having a second multiplier for recursively multiplying an output digital symbol from the tapped-delay line with a second, attenuation coefficient R. A third multiplier is included in the tail canceller for multiplying an output digital symbol of the IIR filter with a third, tap-weight coefficient $C_i$ and applying the multiplied output symbol to one input of the adder to cause it to produce a replica of a echo symbol which is subtracted from digital symbols supplied from an outgoing port of the conversion circuit, producing a residual echo symbol. A symbol appearing at the output end of the tapped-delay line is further delayed on the one hand, and multiplied with the second, attenuation coefficient R on the other. The difference between the delayed and multiplied symbols is detected and further multiplied with a coefficient K which varies as a function of the third, tap-weight coefficient $C_i$ to generate a multiplied difference. The first tap-weight coefficients of the FIR filter are derived from correlations between the residual echo symbol and the successively delayed digital symbols on the tapped-delay line. The second, attenuation coefficient R is derived from a correlation between the residual echo symbol and the multiplied difference. The third, tap-weight coefficient $C_i$ is derived from a correlation between the residual echo symbol and a digital symbol from the end of the tapped-delay line.

According to a second aspect of the present invention, the tail canceller comprises a second multiplier which multiplies an output digital symbol from the end of the tapped-delay line of the FIR filter with a second, tap-weight coefficient $C_i$, and an infinite impulse response filter having a multiplier for recursively multiplying the output of the second multiplier with a third, attenuation coefficient R and applying the multiplied output to one input of the adder to cause it to produce a replica of an echo symbol which is subtracted from digital symbols supplied from the outgoing port of the conversion circuit, producing a residual echo symbol. A digital symbol $a_{n-N}$ from the tapped-delay line of the FIR filter is further delayed and multiplied with the coefficient K to produce a symbol $K \times a_{n-N-1}$. The second, tap-weight coefficient $C_i$ is derived from a correlation between the residual echo symbol and a digital symbol from the tapped-delay line, and the third, attenuation coefficient R is derived from a correlation between the residual echo symbol and the symbol $K \times a_{n-N-1}$.

The coefficient K is a signum function of coefficient $C_i$, i.e., $\text{sgn}(C_i)$ which is $+1$ when $C_i$ is greater than zero and $-1$ when $C_i$ is smaller than zero, or alternatively, the reciprocal of $C_i$.

BRIEF DESCRIPTION OF THE DRAWINGS

The present invention will be described in further detail with reference to the accompanying drawings, in which.

DETAILED DESCRIPTION

Figure 1:
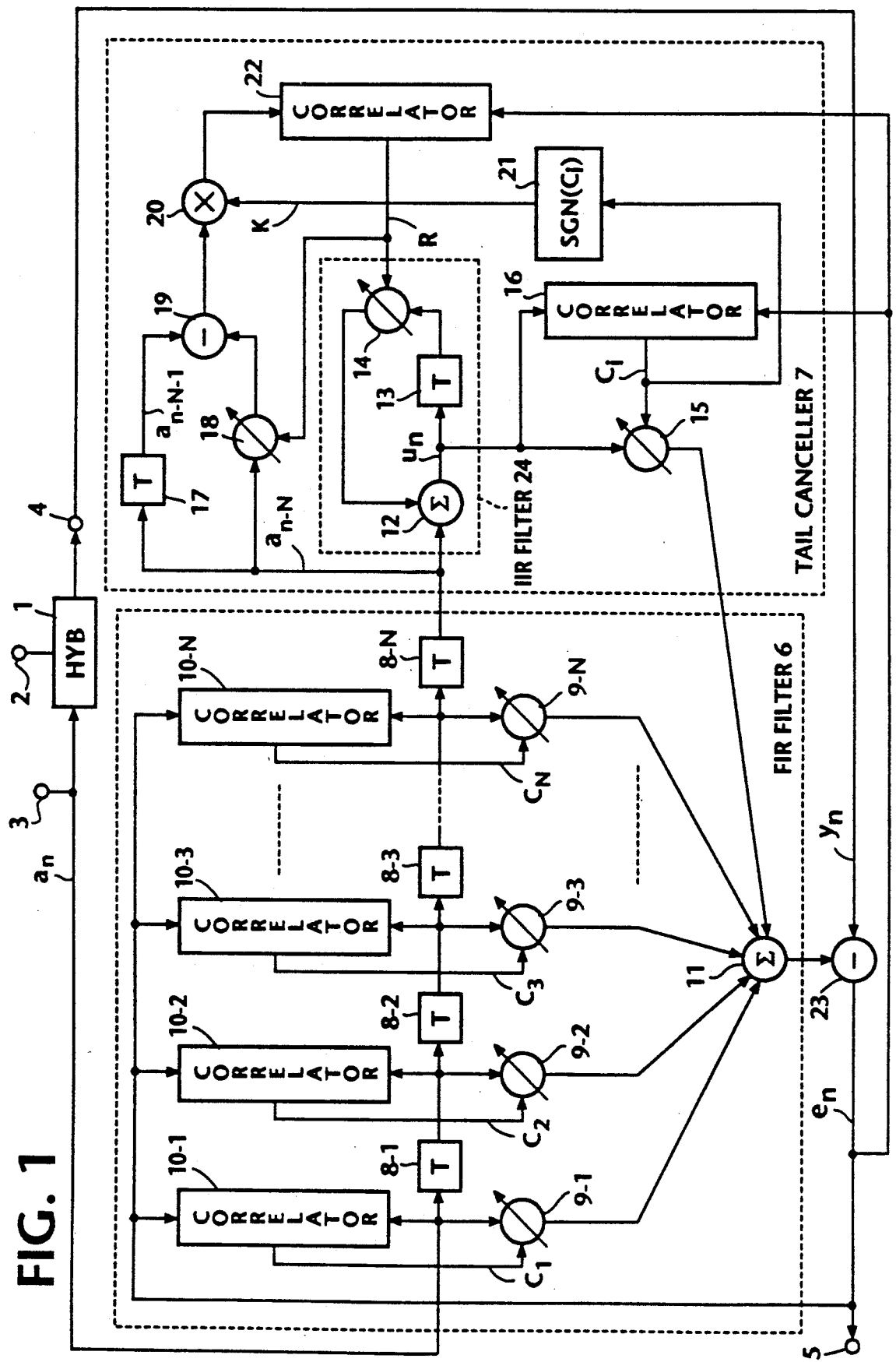
FIG. 1 is a block diagram of an echo canceller according to a first embodiment of the present invention.

Referring now to FIG. 1, there is shown an echo canceller according to a first embodiment of the present invention. The echo canceller is shown connected in a four-wire section of a two-wire four-wire conversion circuit, or hybrid 1 of a digital transmission system. Hybrid 1 has a two-wire port 2 connected to a non-repeatered transmission line (usually a subscriber line), an incoming two-wire port 3 for receiving an incoming digital symbol $a_n$ from the receive end of a repeatered transmission line and an outgoing two-wire port 4 at which an outgoing, echo-containing digital symbol $y_n$ appears.

The echo canceller of this invention generally comprises a nonrecursive, or finite impulse response (FIR)

filter 6 for cancelling a greater part of an echo and a tail canceller 7 which are cascaded from the incoming port 3 to produce a signal at the input of a subtractor 23 that cancels the whole waveform of an echo generated at the outgoing port 4 as a result of trans-hybrid coupling between the ports 3 and 4. The output of subtractor 23 represents a residual echo symbol $e_n$, which appears at an output terminal 5 to which the transmit end of a non-repeatered transmission line is connected.

FIR filter 6 includes a series circuit of delay elements, or shift registers 8-1 through 8-N for successively delaying an incoming digital symbol $a_n$ for interval T which is the reciprocal of the symbol rate of the digital signal, so that at given instant of time, a series of successively delayed digital symbols $a_{n-1}, a_{n-2}, a_{n-3} \ldots a_{n-N}$ appear respectively at the outputs of shift registers 8-1, 8-2, 8-3, ... and 8-N. The input terminals of shift registers 8 are connected respectively to tap-weight multipliers 9-1 through 9-N respectively having tap-weight coefficients $C_1$ through $C_N$. These tap-weight coefficients are supplied respectively from correlators 10-1 through 10-N which are connected to the inputs of shift registers 8-1-8-N for detecting correlations between successively delayed digital symbols and residual echo symbol $e_n$ from subtractor 23. The output digital symbols from tap-weight multipliers 9-1-9-N are summed by an adder 11.

Figure 2:
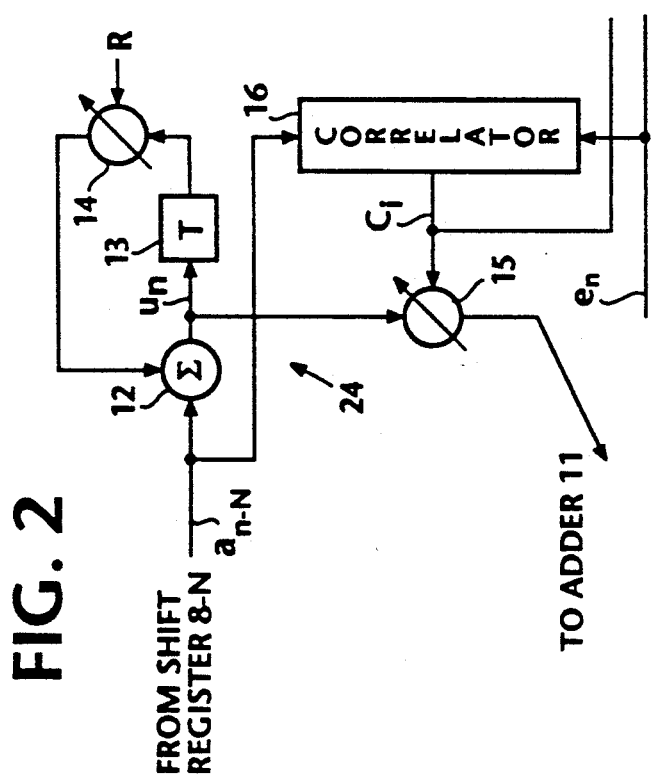

The output of shift register 8-N is supplied to the input of tail canceller 7 which comprises a recursive, or infinite impulse response filter 24 formed by an adder 12, a shift register 13 connected to the output of adder 12 to introduce a delay time T and a multiplier 14 which multiplies the output of shift register 13 with a loop attenuator coefficient R supplied from a correlator 22. Digital symbol $a_{n-N}$ from shift register 8-N is summed with the output of multiplier 14 to produce an output symbol $u_n$ which is supplied to a tap-weight multiplier 15 having a tap-weight coefficient $C_1$ supplied from a correlator 16. Correlator 16 detects correlation between residual echo symbol $e_n$ from subtractor 23 and digital symbol $u_n$ to adaptively control the tap weight of multiplier 15. The digital symbol $C_i x u_n$ from multiplier 15 is supplied to adder 11 as an output digital symbol of tail canceller 7 and summed with the outputs of multipliers 9-1-9-N of FIR filter 6. Alternatively, the input signal of correlator 16 can be taken from the output of shift register 8-N as illustrated in FIG. 2, instead of from the output of adder 12.

The digital symbol $a_{n-N}$ from shift register 8 N is also supplied to a shift register 17 to produce a delayed symbol $a_{n-N-1}$ as well as to a multiplier 18 to multiply $a_{n-N}$ by the loop attenuation coefficient R from correlator 22. A subtractor 19 is connected to the outputs of shift register 17 and multiplier 18 to generate a digital symbol representing the difference between the delayed symbol $a_{n-N-1}$ and the multiplied symbol $R \times a_{n-N}$, i.e., $a_{n-N-1} - R \times a_{n-N}$. This output of subtractor 19 is multiplied by a multiplier 20 with a coefficient K which varies as a function of coefficient $C_i$. Specifically, the coefficient K is a polarity signal "+1" or "−1" depending on the tap-weight coefficient $C_i$ from correlator 16. To this end, a signum function generator 21 is connected to the output of correlator 16 to derive the signal sgn($C_i$), i.e., a polarity bit "1" if the output of correlator $C_i$ is greater than 0 or a polarity bit "−1" if $C_i$ is smaller than 0. Therefore, the output of multiplier 20 is represented by $(a_{n-N-1} - R \times a_{n-N})$ or $-(a_{n-N-1} - R \times a_{n-N})$, which is supplied to a first input of correlator 22 whose second input is supplied with the residual echo symbol $e_n$ from subtractor 23.

Figure 3:
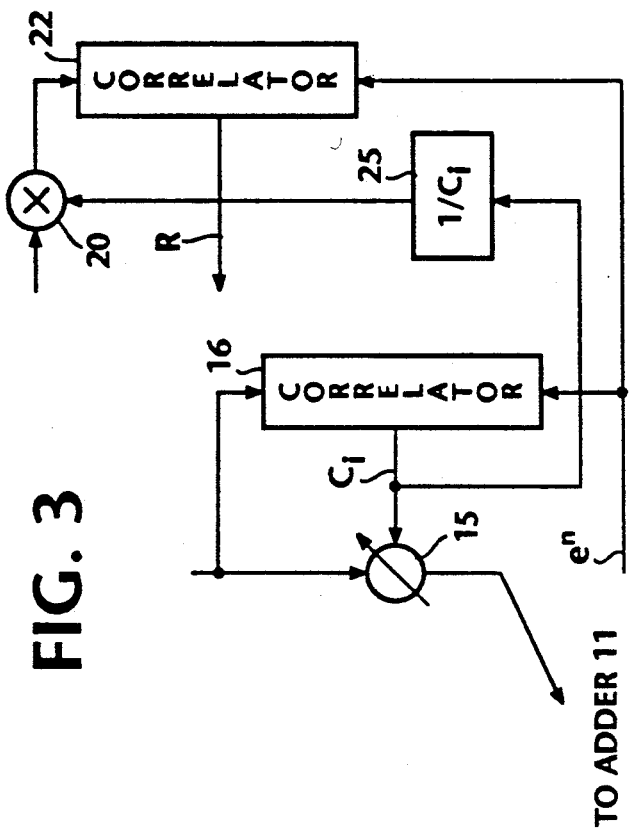
FIGS. 2 and 3 are block diagrams of alternative forms of the first embodiment.

Therefore, the tap-weight coefficient $C_i$ of multiplier 15 is adaptively controlled by the correlation between $e_n$ and $u_n$ and loop attenuation coefficient R of multipliers 14 and 18 is adaptively controlled by the correlation between $e_n$ and $(a_{n-N-1} - R \times a_{n-N})$ sgn($C_i$). Alternatively, the multiplier 20 can be controlled with the reciprocal of the tap-weight coefficient $C_i$, i.e., $1/C_i$, derived by a circuit 25 as illustrated in FIG. 3, to apply a signal $(a_{n-N-1} - R \times a_{n-N})/C_i$ to correlator 22.

Figure 4B:
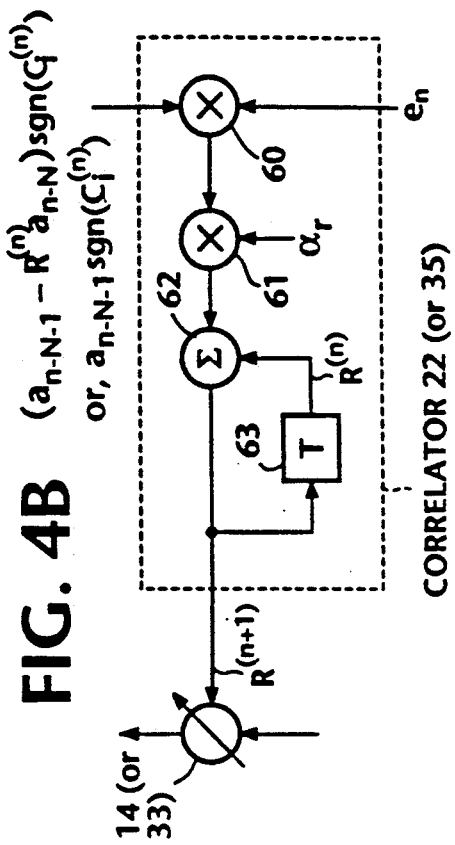
FIGS. 4A and 4B show details of the correlators of FIG. 1.
Figure 4A:
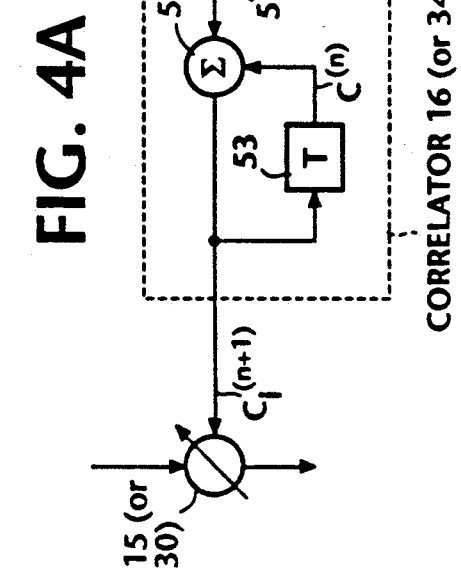

Details of correlators 16 and 22 are shown in FIGS. 4A and 4B, respectively. In FIG. 4A, correlator 16 comprises a multiplier 50 which multiplies residual echo symbol $e_n$ from subtractor 23 with a symbol $a_{n-N}$ from shift register 8-N. The output of multiplier 50 is further multiplied by a multiplier 51 with an adjustment constant $\alpha_i$ and supplied to a first input of an adder 52. A shift register 53 is connected to the output of adder 52 to delay its output symbol for a unit-time delay to produce a coefficient $C_i^{(n)}$ and applies it to the second input of adder 52, producing a coefficient $C_i^{(n+1)} = C_i^{(n)} + \alpha_i \times e_n \times a_{n-N}$ at the tap weight control input of multiplier 15.

In FIG. 4B, correlator 22 comprises a multiplier 60 which multiplies residual echo symbol $e_n$ with the output of multiplier 20 which is represented by $(a_{n-N} - R^{(n)} \times a_{n-N})$ sgn($C_i^{(n)}$). The output of multiplier 60 is further multiplied by a multiplier 61 with an adjustment constant $\alpha_r$ and supplied to a first input of an adder 62. A shift register 63 is connected to the output of adder 62 to delay its output symbol for a unit-time delay to produce a coefficient $R^{(n)}$ and applies it to the second input of adder 62, producing a coefficient $R^{(n+1)} = R^{(n)} + \alpha_r \times e_n (a_{n-N-1} - R^{(n)} \times a_{n-N})$ sgn($C_i^{(n)}$) at the tap weight control input of multiplier 14.

The following is a quantitative analysis of the echo canceller of FIG. 1 that is supposed to cancel a negative exponential echo tail generated as a result of the low-frequency cut-off characteristic of hybrid 1.

Assume that the following relation holds with respect to the incoming digital symbol $a_n$:

$$E[a_n a_{n'}] = a^2 \delta_{nn'} \qquad (1)$$

where, $a^2$ represents the power of input digital symbol, $\delta_{nn'}$ represents Kronecker's delta. By denoting the echo's tail portion as $$h_{Nim} = h_N R_0^m \quad m = 0, 1, \ldots, \quad 0 < R_0 < 1$$

where, $h_N$: symbol value at t=NT; and
$R_0$: echo tail decaying factor of IIR filter 24. Since $C_i^{(n+1)}$ and $R^{(n+1)}$ are given by, $$C_i^{(n+1)} = C_i^{(n)} + \alpha_i e_n a_{n-N} \qquad (2)$$

$$R^{(n+1)} = R^{(n)} + \alpha_r e_n (a_{n-N-1} - R^{(n)} a_{n-N}) \, sgn(C_i^{(n)}) \qquad (3)$$

where, (n) represents the n-th corrected symbol value, the residual echo $e_n$ is given by:

$$e_n = \sum_{k=0}^{N-1} a_{n-k}(h_k - C_k^{(n)}) + \sum_{m=0}^{\infty} a_{n-N-m}(h_N R_0^m - C_i^{(n)} R^{(n)m}) \qquad (4)$$

Note the first term of Equation (4) represents the error associated with the FIR filter 6. The expectations of the values $C_i^{(n)}$ and $R^{(n)}$ are given by:

$$C_i^{(n+1)} = C_i^{(n)} + \alpha_i a^2 (h_N - C_i^{(n)}) \quad (5)$$

$$\begin{aligned}
R^{(n)} &= R^{(n)} + \alpha_r a^2 \{h_N R_0 - C_i^{(n)} R^{(n)} - R^{(n)}(h_N - C_i^{(n)})\} \mathrm{sgn}(C_i^{(n)}) \\
&\approx R^{(n)} + \alpha_r a^2 h_N (R_0 - R^{(n)}) \mathrm{sgn}(h_N) \\
&= R^{(n)} + \alpha_r a^2 |h_N|(R_0 - R^{(n)})
\end{aligned} \quad (6)$$

Therefore,
$$C_i^{(n)} = \beta_i^{(n)} C_i^{(o)} + (1 - \beta_i^{(n)}) h_N \quad (7)$$

$$R^{(n)} = \beta_r^{(n)} R^{(o)} + (1 - \beta_r^{(n)}) R_o \quad (8)$$

where, $\beta_i$ $1 - \alpha_i a^2$, $\beta_r$ $1 - \alpha_r a^2 |h_N|$, where $0 < \beta_i, \beta_r < 1$.

With n approaching infinity, the values $C_i^{(n)}$ and $R^{(n)}$ respectively converge to the following:

$$C_i = C_i^{(\infty)} = \frac{\alpha_i a^2}{1 - \beta_i} h_N = h_N \quad (9)$$

$$R = R^{(\infty)} = \frac{\alpha_r a^2 |h_N|}{1 - \beta_r} R_0 = R_0 \quad (10)$$

These values of convergence completely cancel the tail portion of echo and agree with the optimum values of solution.

Convergence can be demonstrated for echoes having any tail portion by a computer simulation under condition that the low cut-off frequency of hybrid 1 corresponds to 1/200 of the symbol rate and that the main part of an echo is cancelled with FIR filter 6 having N=32 taps, and the tail portion of the echo is assumed to have the following parameters:

$h_N = -0.0118$ $R_0 e^{-2\pi/200} = 0.96907$

The input digital symbol is represented by a random sequence of binary +1 and −1 and the following initial values are used:

$C_k^{(O)} = 0$ (where k=0, 1, ... N−1)

$C_i^{(O)} = 0$ $R^{(O)} = 1$

Figure 5:
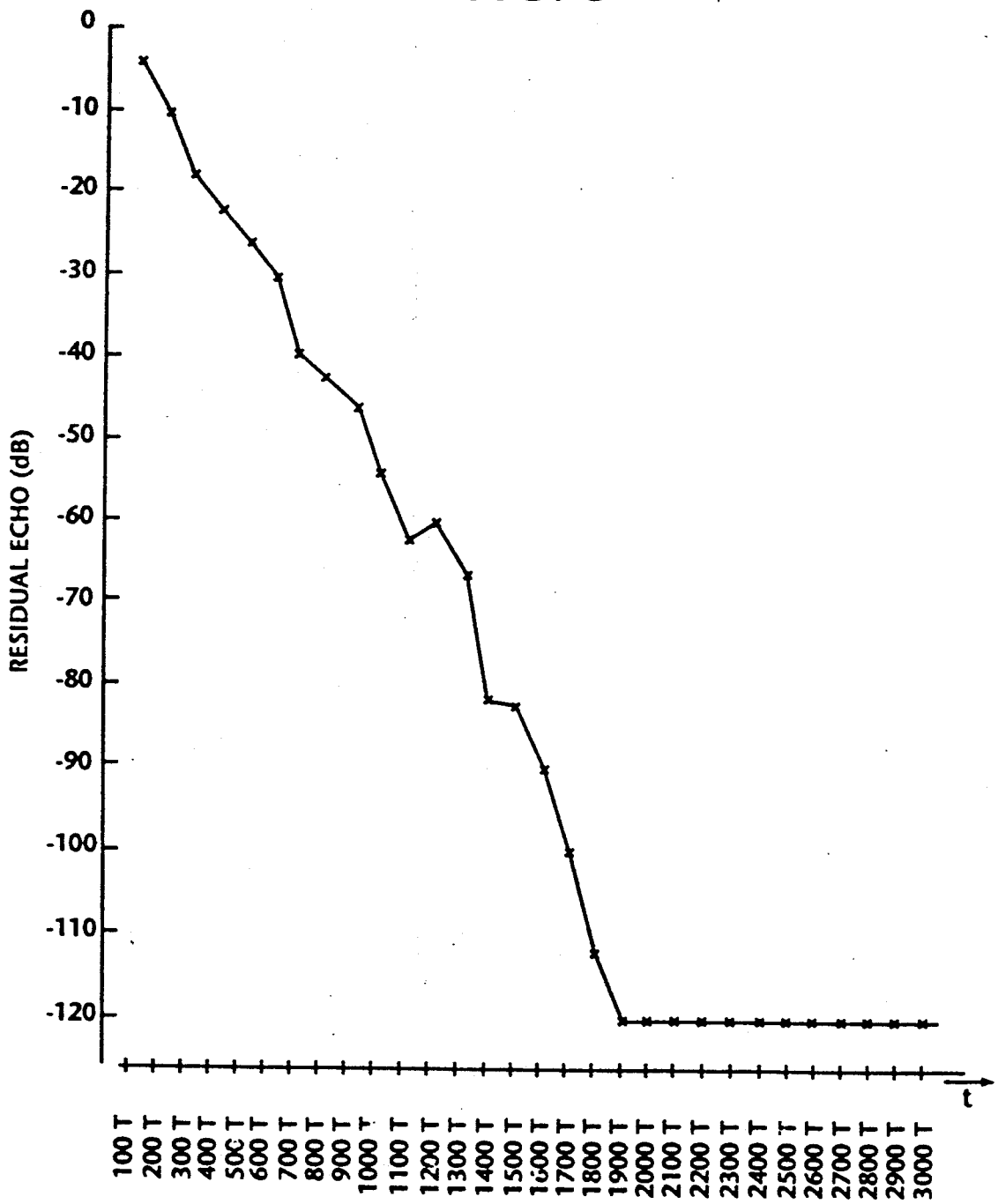
FIG. 5 is a graphic representation of a computer simulation of the first embodiment.

With the computer simulation, coefficients $C_i$ and R were converged respectively to −0.0118 and 0.96907. FIG. 5 illustrates how the average value of residual echo $\epsilon$ $E[e_n^2]$ converges to a value lower than −120 dB Therefore, the echo canceller according to the first embodiment of this invention effectively cancels long-tail echoes using only one recursive filter 24.

Figure 6:
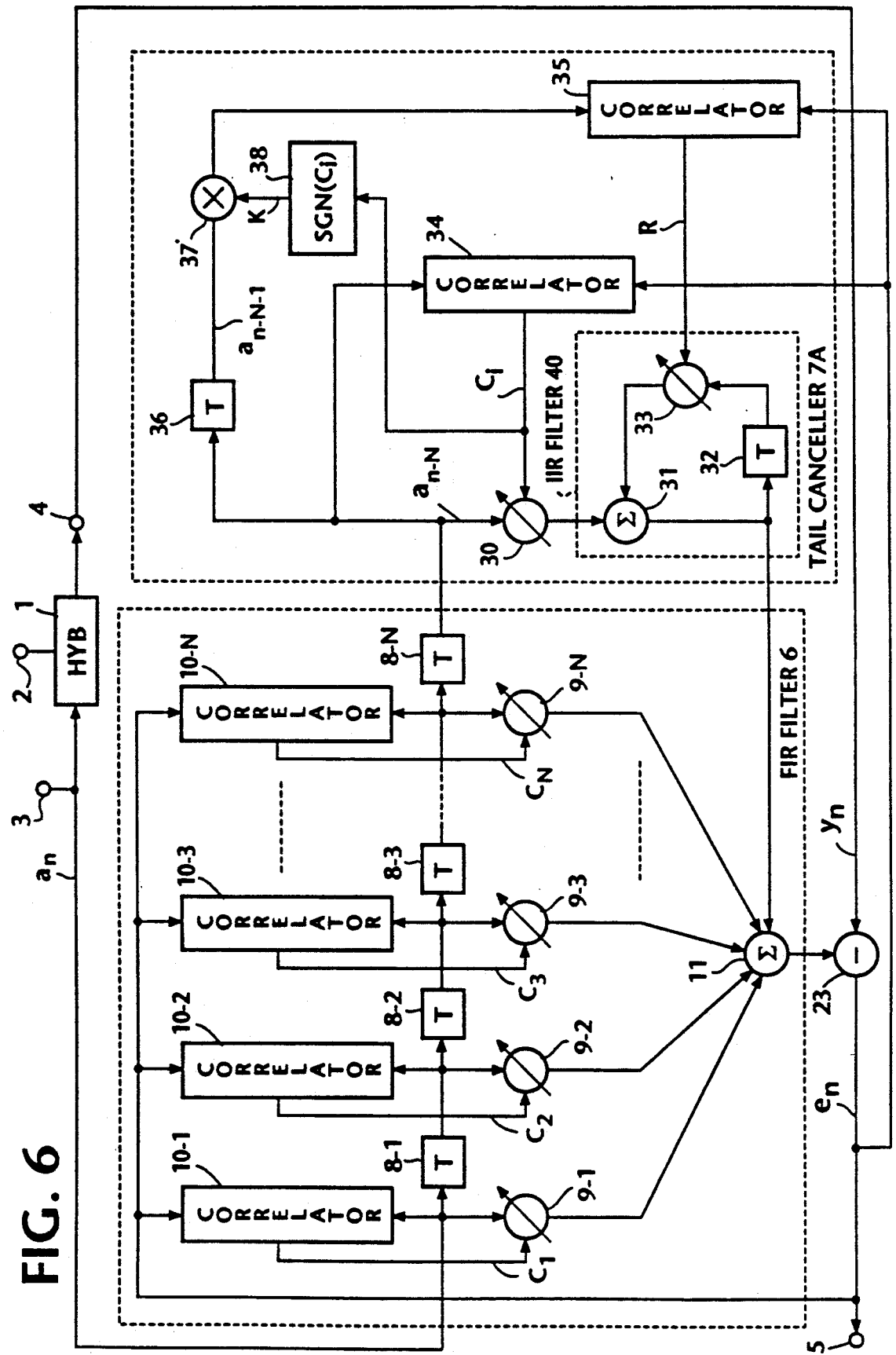
FIG. 6 is a block diagram of an echo canceller according to a second embodiment of the invention.

A further circuit simplification is achieved in a manner as shown in FIG. 6. In this modification, tail canceller 7A comprises a tap-weight multiplier 30 connected to the output of shift register 8-N, and an IIR filter 40 formed by an adder 31 having one input connected to the output of adder 30, a shift register 32 for delaying the output signal from adder 31 for a unit delay time T, and a second tap-weight multiplier 33 connected between the output of shift register 32 and the second input of adder 31. The tap weight of first multiplier 30 is controlled by a signal representing the tap weight coefficient $C_l$ from a correlator 34 which detects correlation between residual echo symbol $e_n$ and the digital symbol $a_{n-N}$ appearing at the input of multiplier 30. The tap weight of second multiplier 33 is controlled by a signal representing the loop attenuation coefficient R supplied from a correlator 35 which detects correlation between the residual echo symbol and the output of a multiplier 37. The output of adder 31 is further connected to adder 11 where the output digital symbol of tail canceller 7A is summed with the outputs of tap-weight multipliers 9-1-9-N.

Tail canceller 7A further includes a shift register 36 for delaying the digital symbol $a_{n-N}$ from shift register 8-N for a unit delay time T. A signum function generator 38 is connected to the output of correlator 34 to supply a polarity bit $\mathrm{sgn}(C_i)$ to multiplier 37. The output shift register 36 is multiplied with this polarity bit $\mathrm{sgn}(C_i)$ to supply a signal $(a_{n-N-1}) \mathrm{sgn}(C_i)$ to correlator 35 to detect correlation between $(a_{n-N-1}) \mathrm{sgn}(C_i)$ and $e_n$. Correlators 34 and 35 are similar to correlators 16 and 22 of the previous embodiment, respectively.

Therefore, the following relations result from the outputs of correlators 34 and 35:

$$C_i^{(n+1)} = C_i^{(n)} + \alpha_i e_n a_{n-N} \quad (11)$$

$$R^{(n+1)} = R^{(n+1)} + \alpha_r e_n a_{n-N-1} \mathrm{sgn}(C^{(n)}) \quad (12)$$

Residual error is therefore given by:

$$e_n = \sum_{k=0}^{N-1} a_{n-k}(h_k - C_k^{(n)}) + \sum_{m=0}^{\infty} a_{n-N-m}(h_{n+m} - C_i^{(n-m)} \pi_m^{(n)}) \quad (13)$$

where, $\pi_m^{(n)}$ $R^{(n)} R^{(n-1)} \ldots R^{(n-m+1)}$ The first term of Equation (13) is the error of the nonrecursive filter, and h, (l=0, 1, ...) represents the echo impulse response. The expectation values of $C_i^{(n)}$ and $R^{(n)}$ are assumed as follows:

$$C_i^{(n+1)} = (1 - \alpha_i a^2) C_i^{(n)} + \alpha_i a^2 h_N \quad (14)$$

$$\begin{aligned}
R^{(n+1)} &= \{1 - \alpha_r a^2 C_i^{(n-1)} \mathrm{sgn}(C_i^n)\} R^{(n)} + \alpha_r a^2 h_N R_h \mathrm{sgn}(C_i^{(n)}) \\
&= (1 - \alpha_r a^2 |C_i^{(n-1)}|) R^{(n)} + \alpha_r a^2 |h_N| R_h
\end{aligned} \quad (15)$$

where, $R_h$ $h_{N+1}/h_N$, and $0 < 1 - \alpha_i a^2$, $1 - \alpha_i |h_N| < 1$. Therefore, with n approaching infinity, $C_i^{(n)}$ converges to $h_N$, and $R^{(n)}$ converges to $R_h$. If the echo tail has a first order of decaying characteristic such as one below, $h_{N+m} = h_N R_0^m$ (where m=0, 1, ...)

$R^{(n)}$ coverges to $R_0$. The tail canceller 7A of FIG. 6 is also capable of completely cancelling the tail portion of an echo. Using the following parameters, $h_N = -0.0118$ $R_0 = e^{-2\pi/200} = 0.96907$ $C_k^{(O)} = 0$, where k=0, 1, ... N−−1

Figure 7:
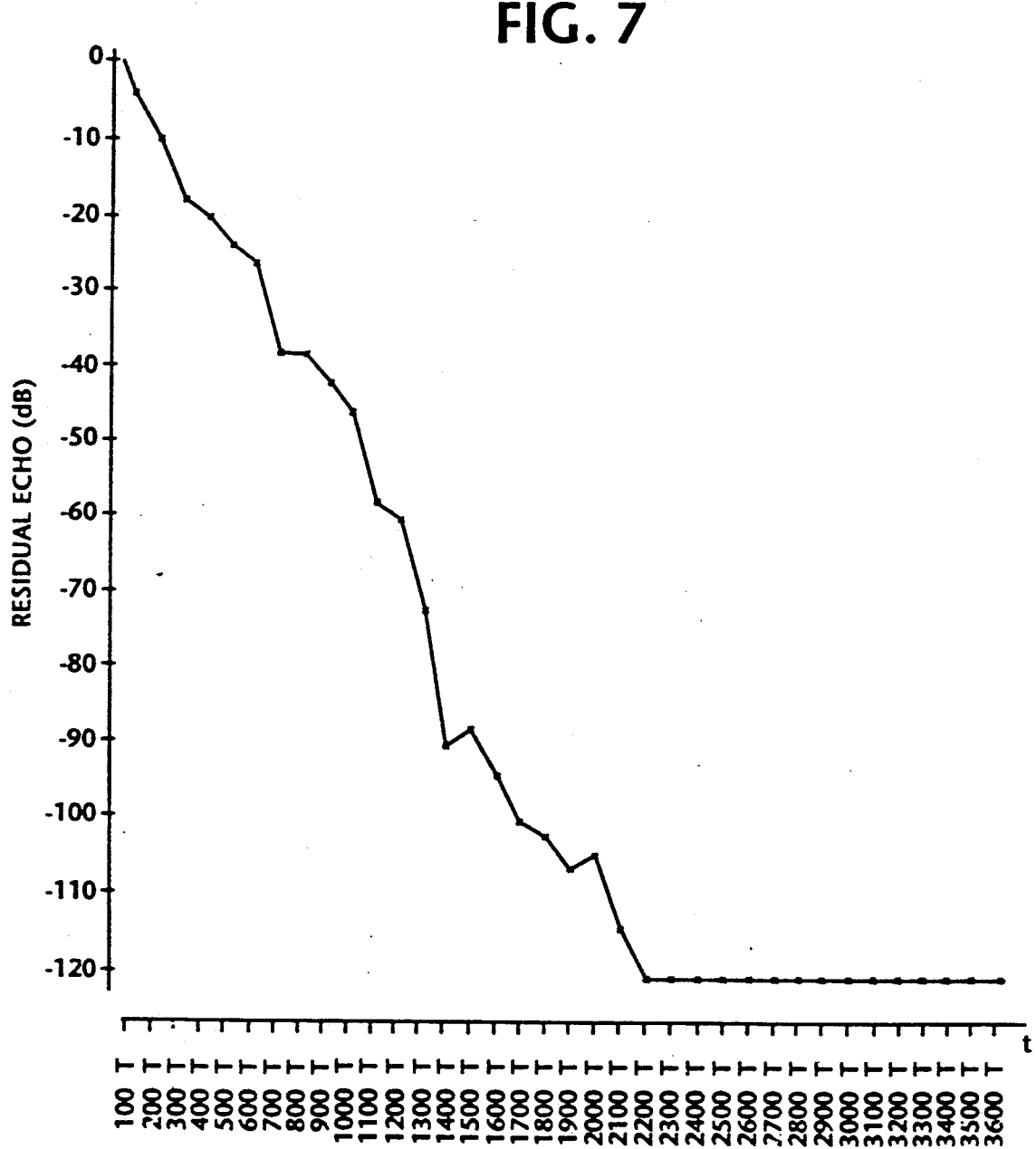
FIG. 7 is a graphic representation of a computer simulation of the second embodiment.

$C_i^{(O)} = 0$, $$R^{(0)} = \frac{15}{16} = 0.9375$$

a computer simulation indicates that coefficients $C_i$ and R converge to $-0.0118$ and $0.96907$, respectively, as illustrated in FIG. 7.

The foregoing description shows only preferred embodiments of the present invention. Various modifications are apparent to those skilled in the art without departing from the scope of the present invention which is only limited by the appended claims. Therefore, the embodiments shown and described are only illustrated, not restrictive.

What is claimed is:

1. An echo canceller adapted for connection to the four-wire section of a two-wire four-wire conversion circuit, comprising:

a finite impulse response filter including a tapped-delay line defining successive taps connected to an incoming port of said conversion circuit, a plurality of first tap-weight multipliers connected respectively to said taps for respectively multiplying successively delayed digital symbols travelling along said tapped-delay line with first tap-weight coefficients, and an adder for summing the outputs of said first tap-weight multipliers;

an infinite impulse response filter including a second multiplier for recursively multiplying an output digital symbol from said tapped-delay line with a second, attenuation coefficient;

a third multiplier for multiplying an output digital symbol of said infinite impulse response filter with a third, tap-weight coefficient and applying the multiplied output symbol to one input of said adder to produce a replica of an echo symbol;

a first subtractor for subtracting said replica from digital symbols supplied from an outgoing port of said conversion circuit to produce a residual echo symbol;

a delay element for further delaying a symbol appearing at one end of said tapped delay line;

a fourth multiplier for multiplying the symbol at said end of the tapped-delay line with said second, attenuation coefficient;

a second subtractor for detecting a difference between the outputs of said delay element and said fourth multiplier;

means for multiplying the output of said second subtractor with a coefficient which varies as a function of said third, tap-weight coefficient;

a plurality of first correlators for detecting correlations between said residual echo symbol and said successively delayed digital symbols and applying the detected correlations respectively to said first tap-weight multipliers as said first tap-weight coefficients;

a second correlator for detecting a correlation between said residual echo symbol and the output of said multiplying means and applying the detected correlation to the second multiplier of said infinite impulse response filter as said second, attenuation coefficient; and a third correlator for detecting a correlation between said residual echo symbol and a digital symbol from said tapped-delay line and applying the detected correlation to said third multiplier as said third, tap-weight coefficient.

2. An echo canceller as claimed in claim 1, wherein said multiplying means includes means for generating a signum function of said third, tap-weight coefficient and multiplying the output of said second subtractor with said signum function, said signum function being representative of the polarity of said third, tap-weight coefficient and being equal to $+1$ when said third, tap-weight coefficient is greater than zero and $-1$ when said third, tap-weight coefficient is smaller than zero.

3. An echo canceller as claimed in claim 1, wherein said multiplying means includes means for generating a signal representative of the reciprocal of said third, tap-weight coefficient and multiplying the output of said second subtractor with said reciprocal representative signal.

4. An echo canceller as claimed in claim 1, wherein said second correlator comprises:

means for multiplying said residual echo symbol with the output of said multiplying means and an adjustment constant to produce a corrected symbol;

means for summing said corrected symbol with a delayed symbol applied thereto to produce a summed symbol, the output of the summing means being coupled to said second multiplier as said second, attenuation coefficient; and means for delaying the summed symbol for a unit time interval and supplying a symbol from the output of the summing means to an input of the summing means as said delayed symbol.

5. An echo canceller as claimed in claim 1, wherein said third correlator comprises:

means for multiplying said residual echo symbol with the digital symbol from said tapped-delay line and an adjustment constant to produce a corrected symbol;

means for summing said corrected symbol with a delayed symbol applied thereto to produce a summed symbol, the output of the summing means being coupled to said third multiplier as said third, tap-weight coefficient; and means for delaying the summed symbol for a unit time interval and supplying a symbol from the output of the summing means to an input of the summing means as said delayed symbol.

6. An echo canceller adapted for connection to the four-wire section of a two-wire four-wire conversion circuit, comprising:

a finite impulse response filter including a tapped-delay line defining successive taps connected to an incoming port of said conversion circuit, a plurality of first tap-weight multipliers connected respectively to said taps for respectively multiplying successively delayed digital symbols travelling along said tapped-delay line with first tap-weight coefficients, and an adder for summing the outputs of said first tap-weight multipliers;

a second multiplier for multiplying an output digital symbol from one end of said tapped-delay line with a second, tap-weight coefficient;

an infinite impulse response filter including a third multiplier for recursively multiplying the output of said second multiplier with a third, attenuation coefficient and applying the multiplied output to one input of said adder to produce a replica of an echo symbol;

a subtractor for subtracting said replica from digital symbols supplied from an outgoing port of said conversion circuit to produce a residual echo symbol;

a delay element for further delaying a symbol appearing at said end of the tapped delay line;

means for multiplying an output symbol from the delay element with a coefficient which varies as a function of said second, tap-weight coefficient;

a plurality of first correlators for detecting correlations between said residual echo symbol and said successively delayed digital symbols and applying the detected correlations respectively to said first tap-weight multipliers as said first tap-weight coefficients;

a second correlator for detecting a correlation between said residual echo symbol and a digital symbol from said tapped-delay line and applying the detected correlation to said second multiplier as said second, tap-weight coefficient; and a third correlator for detecting a correlation between said residual echo symbol and the output of said multiplying means and applying the detected correlation to the third multiplier of said infinite impulse response filter as said third, attenuation coefficient.

7. An echo canceller as claimed in claim 6, wherein said multiplying means includes means for generating a signum function of said second, tap-weight coefficient and multiplying the output of said delay element with said signum function, said signum function representative of the polarity of said second, tap-weight coefficient and being equal to +1 when said second tap-weight coefficient is greater than zero and −1 when said second, tap-weight coefficient is smaller than zero.

8. An echo canceller as claimed in claim 6, wherein said multiplying means includes means for generating a signal representative of the reciprocal of said second, tap-weight coefficient and multiplying the output of said subtractor with said reciprocal representative signal.

9. An echo canceller as claimed in claim 6, wherein said second correlator comprises:

means for multiplying said residual echo symbol with the digital symbol from said tapped-delay line and an adjustment constant to produce a corrected symbol;

means for summing said corrected symbol with a delayed symbol applied thereto to produce a summed symbol, the output of the summing means being coupled to said second multiplier as said second, tap-weight coefficient; and means for delaying the summed symbol for a unit time interval and supplying a symbol from the output of said summing means to an input of said summing means as said delayed symbol.

10. An echo canceller as claimed in claim 6, wherein said third correlator comprises:

means for multiplying said residual echo symbol with the output of said multiplying means and an adjustment constant to produce a corrected symbol;

means for summing said corrected symbol with a delayed symbol applied thereto to produce a summed symbol, the output of the summing means being coupled to said third multiplier as said third, attenuation coefficient; and means for delaying the summed symbol for a unit time interval and supplying a symbol from the output the summing means to an input of said summing means as said delayed symbol.

* * * * *

UNITED STATES PATENT AND TRADEMARK OFFICE
CERTIFICATE OF CORRECTION

Page 1 of 4

PATENT NO. : 5,084,865
DATED : January 28, 1992
INVENTOR(S) : Shin'ichi Koike

It is certified that error appears in the above-indentified patent and that said Letters Patent is hereby corrected as shown below:

Col. 3, line 42, delete "$C_l x\ u_n$" and insert --$\overline{C_l\ x\ u_n}$--;

Col. 4, line 44, delete "$a^2$" and insert --$\overline{a^2}$--;

Col. 4, line 46, delete "$a^2$" and insert --$\overline{a^2}$--;

Col. 4, line 50, delete "$\Omega,1,\ldots,\Omega$" and insert --$0,1,\ldots,0$--;

Col. 5, line 1, delete "$C_i^{(n+1)}=C_i^{(n)}+a_i a^2(h_N-C_i^{(n)})$" and insert --$\overline{C_i^{(n+1)}}=\overline{C_i^{(n)}}+a_i\overline{a^2}(h_N-\overline{C_i^{(n)}})$--;

Col. 5, line 5, delete "$R^{(n)} = R^{(n)} + a_i a^2\{h_N R_0 - C_i^{(n)} R^{(n)} - R^{(n)}(h_N - C_i^{(n)})\}$" and insert --$\overline{R^{(n)}}=\overline{R^{(n)}}+a_i\overline{a^2}\{h_N R_0-\overline{C_i^{(n)}R^{(n)}}-\overline{R^{(n)}(h_N-C_i^{(n)})}\}$--;

Col. 5, line 7, delete "$R^{(n)} + a_r a^2$" and insert --$\overline{R^{(n)}}+a_r\overline{a^2}$--;

Col. 5, line 8, delete "$R^{(n)} + a_r a^2$" and insert --$\overline{R^{(n)}} + a_r\overline{a^2}$--;

Col. 5, line 11, delete "$C_i^{(n)}$" and insert --$\overline{C_i^{(n)}}$--;

UNITED STATES PATENT AND TRADEMARK OFFICE
CERTIFICATE OF CORRECTION

Page 2 of 4

PATENT NO. : 5,084,865
DATED : January 28, 1992
INVENTOR(S) : Shin'ichi Koike

It is certified that error appears in the above-indentified patent and that said Letters Patent is hereby corrected as shown below:

Col. 5, line 12, delete "$R^{(n)}$" and insert --$\overline{R^{(n)}}$--;

Col. 5, line 15, delete "$\beta_i \ 1-a_i a^2, \beta_r \ 1-a_r a^2$" and insert --$\beta_i \underline{\Delta} \overline{1-a_i a^2}, \beta_r \underline{\Delta} \overline{1-a_r a^2}$--;

Col. 5, line 18, delete "$C_i^{(n)}$ and $R^{(n)}$" and insert --$\overline{C_i^{(n)}}$ and $\overline{R^{(n)}}$--;

Col. 5, line 21 delete "$C_i = C_i^{(*)} = a_i a^2$" and insert --$\overline{C_i} = \overline{C_i^{(*)}} = \dfrac{\overline{a_i a^2}}{\overline{1-\beta i}}$-- ;

Col 5, line 25, delete "$R = R^{(*)} = a_r a^2 |h_N|$" and insert --$\overline{R} = \overline{R^{(*)}} = \dfrac{\overline{a_r a^2 |h_N|}}{\overline{1-\beta_r}}$-- ;

Col. 5, line 39, delete "$R_0 e$" and insert --$R_0 = e$--;

Col. 5, line 53, after "$\epsilon$" insert --$\underline{\Delta}$--;

UNITED STATES PATENT AND TRADEMARK OFFICE
CERTIFICATE OF CORRECTION

PATENT NO. : 5,084,865
DATED : January 28, 1992
INVENTOR(S) : Shin'ichi Koike

It is certified that error appears in the above-indentified patent and that said Letters Patent is hereby corrected as shown below:

Col. 6, line 1, delete "$C_l$" and insert --$C_i$--;

Col. 6, line 18, delete both occurrences of "$C_l$" and insert --$C_i$--;

Col. 6, line 36, after "$\pi_m^{(n)}$", insert --$\underline{a}$--;

Col. 6, line 41, delete "$C_i^{(n+1)} = (1 - a_i a^2) C_i^{(n)} + a_i a^2$" and insert --$\overline{C_i^{(n+1)}} = (1 - a_i \overline{a^2}) Ci^{(n)} + a_i \overline{a^2}$--;

Col. 6, line 45, delete "$R^{(n+1)} = \{1 - a_r a^2 C_i^{(n-1)} \text{sgn}(C_i^n)\} R^{(n)} + a_r a^2$" and insert --$\overline{R^{(n+1)}} = \{1 - a_r \overline{a^2} C_i^{(n-1)} \text{sgn}(C_i^n)\} \overline{R^{(n)}} + a_r \overline{a^2}$--;

Col. 6, line 47, delete "$(1 - a_r a^2 |C_i^{(n-1)}|) R^{(n)} + a_r a^2$" and insert --$(1 - a_r \overline{a^2} |\overline{C_i^{(n-1)}}|) \overline{R^{(n)}} + a_r \overline{a^2}$--;

Col. 6, line 49, after "$R_h$", insert --$\underline{\dot{a}}$--;

UNITED STATES PATENT AND TRADEMARK OFFICE
CERTIFICATE OF CORRECTION

PATENT NO. : 5,084,865
DATED : January 28, 1992
INVENTOR(S) : Shin'ichi Koike

It is certified that error appears in the above-indentified patent and that said Letters Patent is hereby corrected as shown below:

Col. 6, line 49, delete "$a^2$" and insert --$\overline{a}^2$--.

Signed and Sealed this

Twenty-eighth Day of September, 1993

Attest:

BRUCE LEHMAN

*Attesting Officer*    *Commissioner of Patents and Trademarks*